United States Patent
Porat et al.

(10) Patent No.: US 10,164,744 B2
(45) Date of Patent: *Dec. 25, 2018

(54) FLEXIBLE OFDMA PACKET STRUCTURE FOR WIRELESS COMMUNICATIONS

(71) Applicant: Avago Technologies General IP (Singapore) Pte. Ltd., Singapore (SG)

(72) Inventors: Ron Porat, San Diego, CA (US); Matthew James Fischer, Mountain View, CA (US); Nihar Jindal, Mountain View, CA (US); Vinko Erceg, Cardiff by the Sea, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/659,080

(22) Filed: Jul. 25, 2017

(65) Prior Publication Data

US 2017/0324522 A1   Nov. 9, 2017

Related U.S. Application Data

(63) Continuation of application No. 14/302,612, filed on Jun. 12, 2014, now Pat. No. 9,729,285.

(Continued)

(51) Int. Cl.
*H04W 4/00* (2018.01)
*H04L 5/00* (2006.01)

(52) U.S. Cl.
CPC ............ *H04L 5/003* (2013.01); *H04L 5/0007* (2013.01); *H04L 5/0053* (2013.01)

(58) Field of Classification Search
CPC ....... H04L 5/001; H04L 5/003; H04L 5/0007; H04L 5/0023; H04L 5/0037; H04L 5/0039; H04L 5/0041; H04L 5/0053
See application file for complete search history.

(56) References Cited

U.S. PATENT DOCUMENTS

| 2011/0032875 A1* | 2/2011 | Erceg | H04B 7/0452 |
| | | | 370/328 |
| 2011/0038332 A1* | 2/2011 | Liu | H04L 1/1685 |
| | | | 370/329 |

(Continued)

*Primary Examiner* — Kevin D Mew
(74) *Attorney, Agent, or Firm* — Garlick & Markison; Shayne X. Short

(57) ABSTRACT

A communication device includes a processor configured to generate OFDMA packets using various OFDMA packet structures and to transmit such OFDMA packets, via a communication interface, to at least one other communication device. The processor is also configured to receive, interpret, and process such OFDMA packets. One example of an OFDMA packet includes common SIG for two or more other wireless communication devices modulated across all sub-carriers of the OFDMA packet. The common SIG is followed by first SIG and first data for a first other wireless communication device modulated across first subset of the sub-carriers of the OFDMA packet and is also followed by second SIG and second data for a second other wireless communication device modulated across second subset of the sub-carriers of the OFDMA packet. Another example of an OFDMA packet includes the common SIG followed directly by first data and second data modulated as described above.

20 Claims, 8 Drawing Sheets

Related U.S. Application Data

(60) Provisional application No. 61/976,981, filed on Apr. 8, 2014, provisional application No. 61/865,435, filed on Aug. 13, 2013, provisional application No. 61/834,824, filed on Jun. 13, 2013.

(56) References Cited

U.S. PATENT DOCUMENTS

| | | | |
|---|---|---|---|
| 2011/0170627 A1* | 7/2011 | Kwon | H04L 25/0204 375/295 |
| 2012/0014336 A1* | 1/2012 | Seok | H04L 5/0007 370/329 |
| 2012/0044925 A1* | 2/2012 | Lee | H04L 27/2602 370/338 |
| 2012/0213305 A1* | 8/2012 | Oh | H04L 1/0083 375/267 |
| 2012/0263158 A1* | 10/2012 | Lee | H04L 1/007 370/338 |
| 2012/0294294 A1* | 11/2012 | Zhang | H04L 1/0025 370/338 |
| 2014/0119327 A1* | 5/2014 | Oh | H04L 1/0083 370/329 |
| 2014/0307650 A1* | 10/2014 | Vermani | H04L 5/0044 370/329 |
| 2015/0163028 A1* | 6/2015 | Tandra | H04L 5/0037 370/203 |
| 2015/0334708 A1* | 11/2015 | Lee | H04L 1/00 370/329 |
| 2016/0323778 A1* | 11/2016 | Vermani | H04W 28/065 |
| 2016/0329999 A1* | 11/2016 | Li | H04L 5/0007 |
| 2016/0365954 A1* | 12/2016 | Lee | H04L 5/005 |

\* cited by examiner

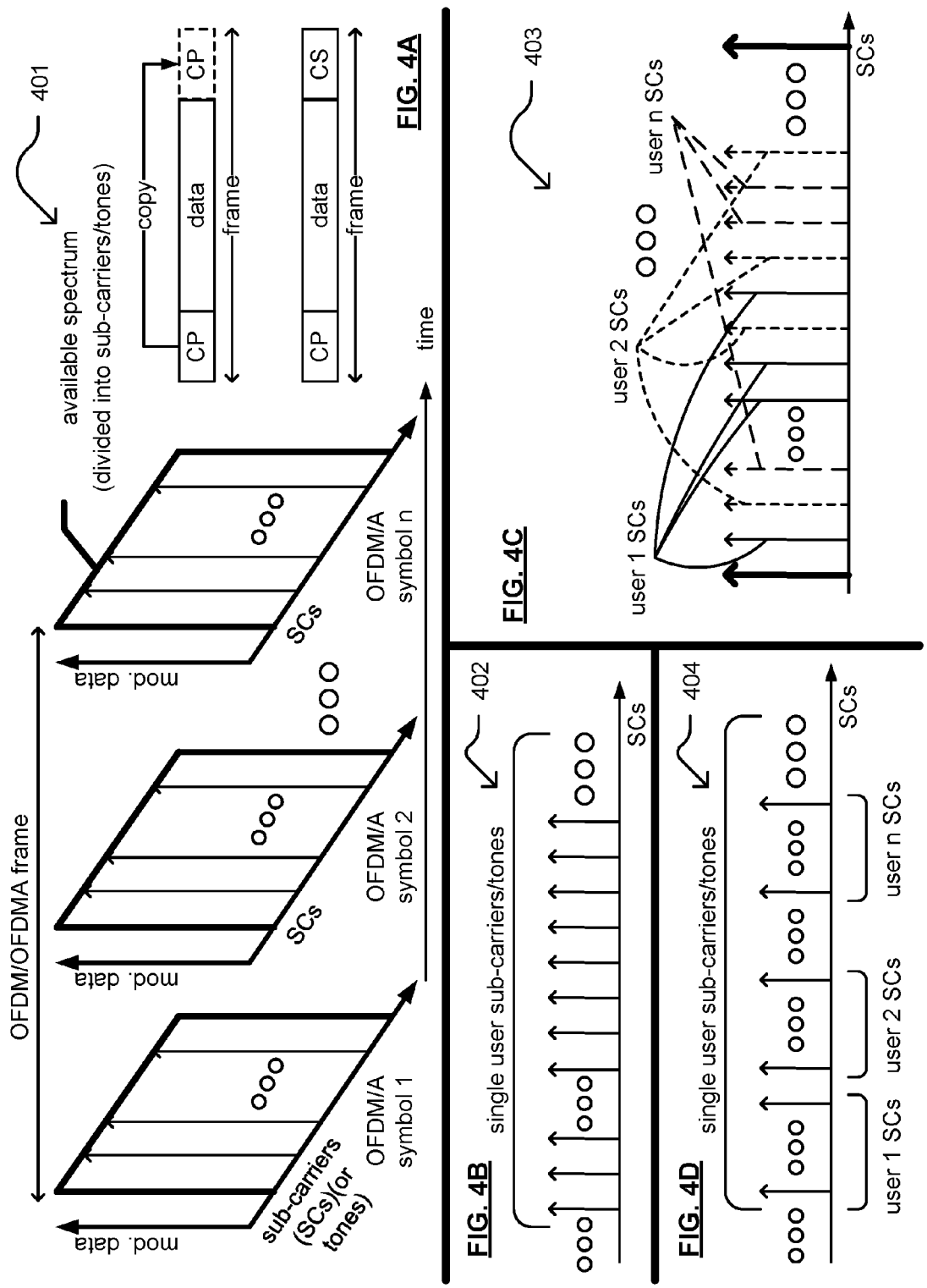

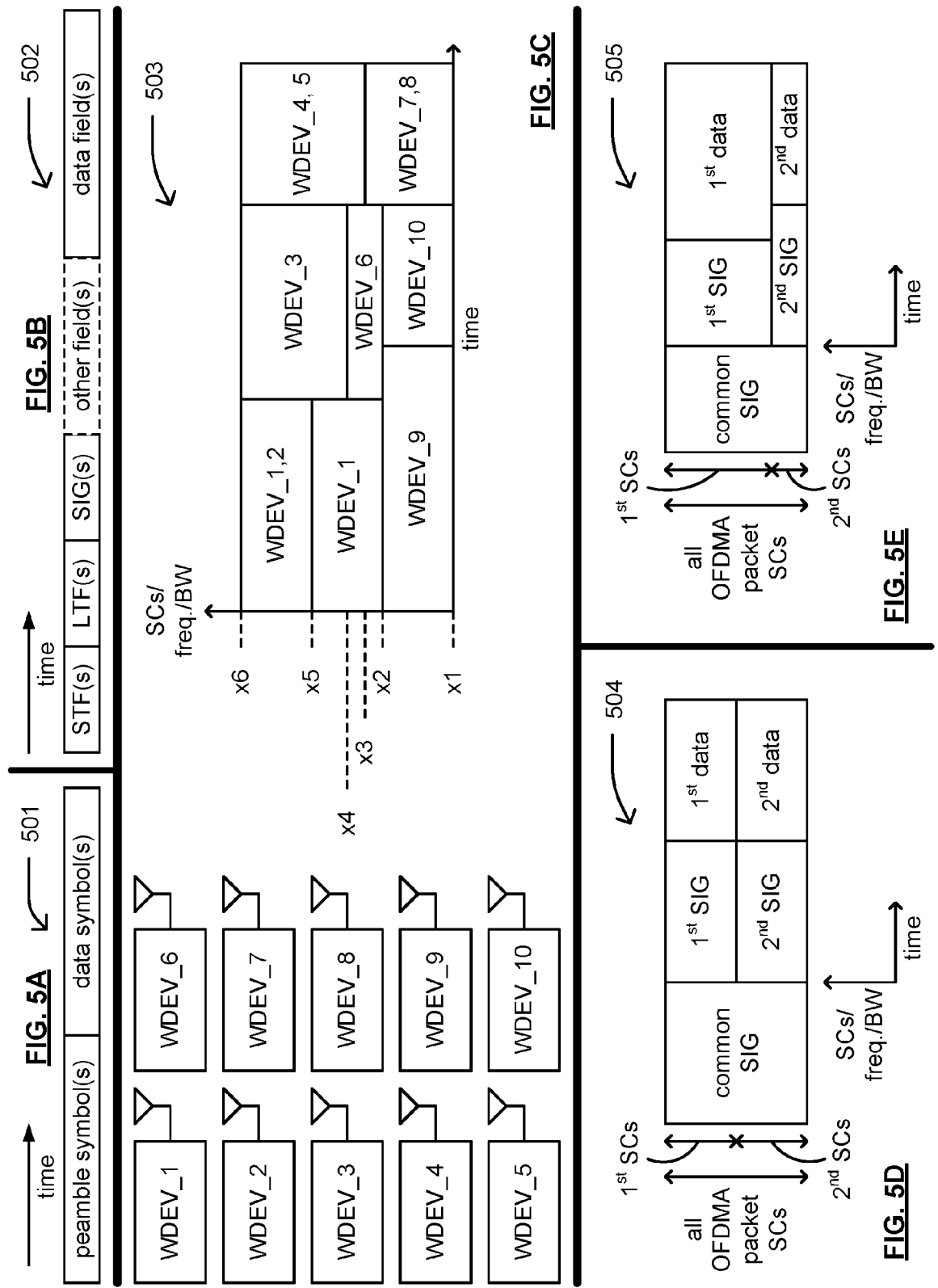

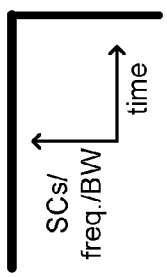

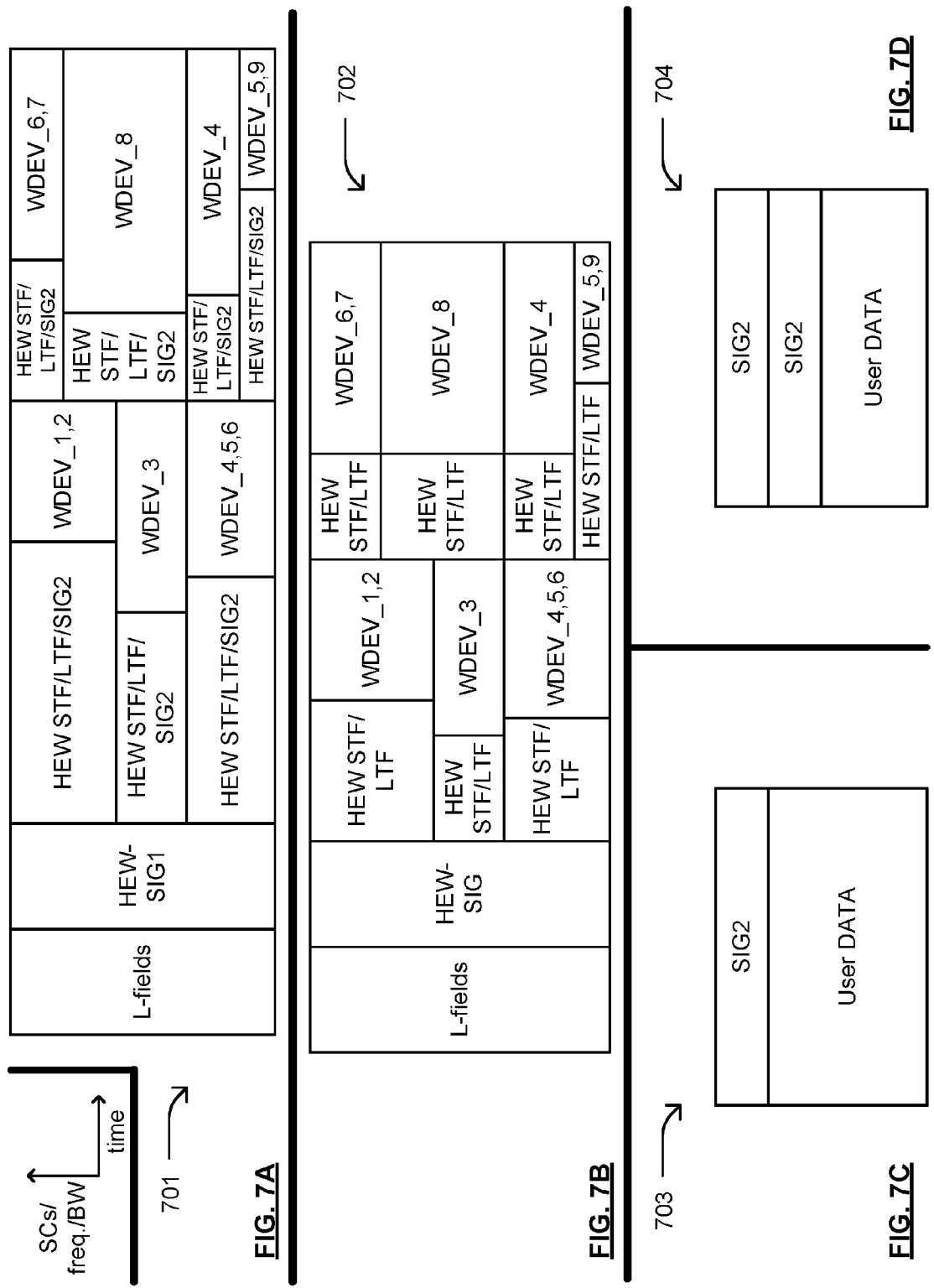

FLEXIBLE OFDMA PACKET STRUCTURE
FOR WIRELESS COMMUNICATIONS

CROSS REFERENCE TO RELATED PATENTS/PATENT APPLICATIONS

The present U.S. Utility Patent Application claims priority pursuant to 35 U.S.C. § 120 as a continuation to U.S. Utility application Ser. No. 14/302,612, entitled "Flexible OFDMA packet structure for wireless communications," filed Jun. 12, 2014, which claims priority pursuant to 35 U.S.C. § 119(e) to U.S. Provisional Application No. 61/834,824, entitled "Group identifier (GID) within high efficiency wireless communications," filed Jun. 13, 2013; U.S. Provisional Application No. 61/865,435, entitled "Constrained frame format for high efficiency wireless communications," filed Aug. 13, 2013; and U.S. Provisional Application No. 61/976,981, entitled "Constrained frame format for high efficiency wireless communications," filed Apr. 8, 2014, all of which are hereby incorporated herein by reference in their entirety and made part of the present U.S. Utility Patent Application for all purposes.

BACKGROUND

Technical Field

The present disclosure relates generally to communication systems; and, more particularly, to flexible packet structures within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

New communication standards, protocols, and/or recommended practices continue to be developed for various communication system types. In the context of wireless communications, there continues to be development of new and improved/next-generation versions of IEEE 802.11. Such versions of IEEE 802.11 can provide increases in the amount of data that may be transmitted between devices as well as improvements in the manner by which data is transmitted between devices.

BRIEF DESCRIPTION OF THE SEVERAL VIEWS OF THE DRAWINGS

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA

FIG. 5A is a diagram illustrating an example of an OFDMA packet.

FIG. 5B is a diagram illustrating another example of an OFDMA packet.

FIG. 5C is a diagram illustrating another example of an OFDMA packet.

FIG. 5D is a diagram illustrating another example of an OFDMA packet.

FIG. 5E is a diagram illustrating another example of an OFDMA packet.

FIG. 6A is a diagram illustrating another example of an OFDMA packet.

FIG. 6B is a diagram illustrating another example of an OFDMA packet.

FIG. 6C is a diagram illustrating another example of an OFDMA packet.

FIG. 6D is a diagram illustrating another example of an OFDMA packet.

FIG. 6E is a diagram illustrating another example of an OFDMA packet.

FIG. 7A is a diagram illustrating another example of an OFDMA packet.

FIG. 7B is a diagram illustrating another example of an OFDMA packet.

FIG. 7C is a diagram illustrating another example of an OFDMA packet.

FIG. 7D is a diagram illustrating another example of an OFDMA packet.

DETAILED DESCRIPTION

Figure 1:
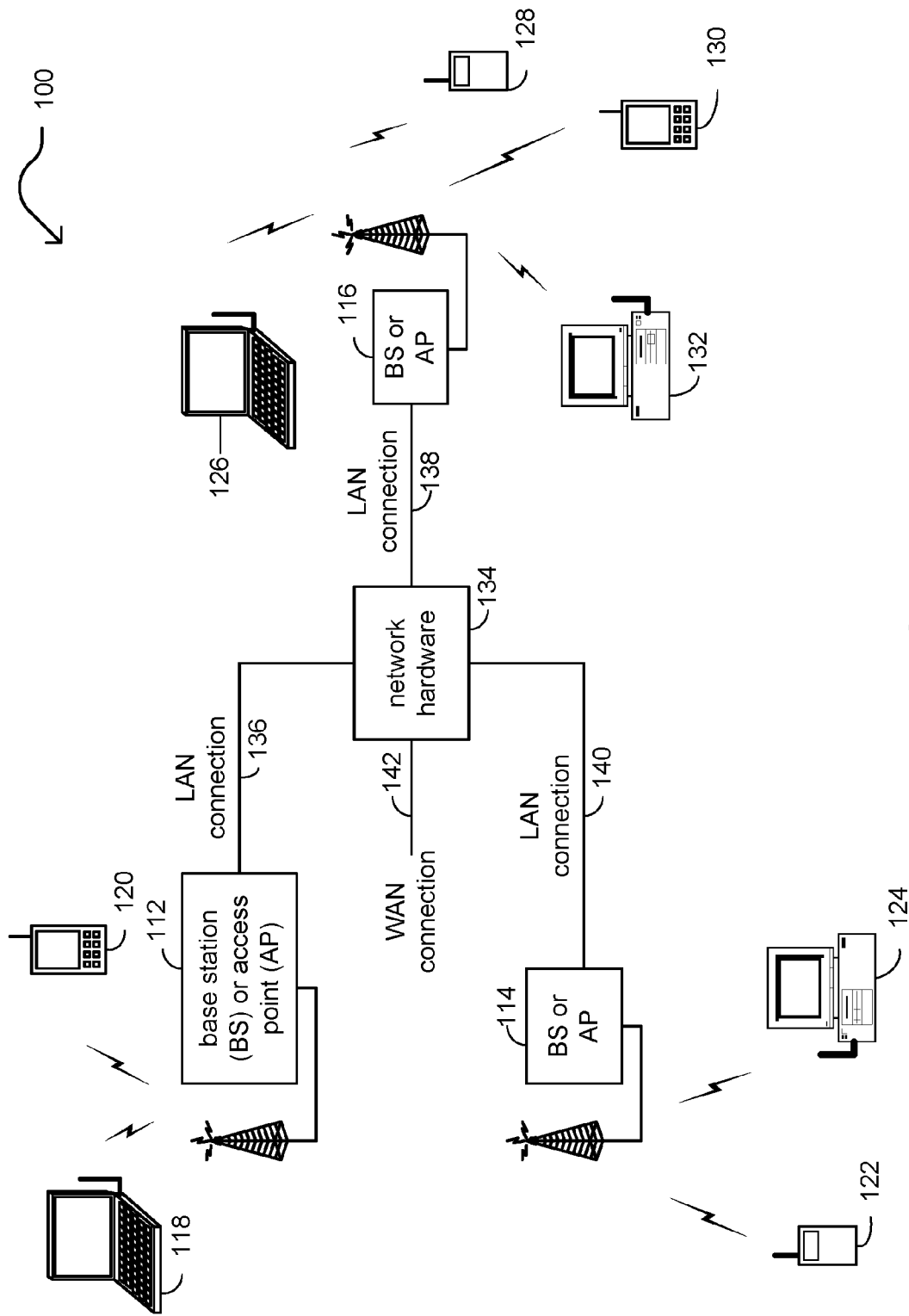
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116. Such communications may be uni-directional or bi-directional between devices. Also, such communications may be uni-directional between devices at one time and bi-directional between those devices at another time.

Generally speaking, any of the various devices (e.g., WDEVs 118-132 and BSs or APs 112-116) may be configured to support communications based on at least one communication standard, protocol, and/or the recommended practice. In some instances, a given device may be configured to support communications based on only one communication standard, protocol, and/or recommended practice.

In one example, a processor within a device is configured to generate an orthogonal frequency division multiple access (OFDMA) packet. The OFDMA packet includes common signal field (SIG) for first and second other wireless communication devices modulated across all sub-carriers of the OFDMA packet. The common SIG is followed by first SIG and first data for the first other wireless communication device modulated across first subset of the sub-carriers of the OFDMA packet, and the common SIG is also followed by second SIG and second data for the second other wireless communication device modulated across second subset of the sub-carriers of the OFDMA packet, wherein the first SIG has different length than the second SIG. The processor within the device is also configured to transmit the OFDMA packet, via a communication interface of the communication device, to the first and the second other wireless communication devices. The first and second subsets of sub-carriers of the OFDMA packet may each respectively include different numbers of sub-carriers for the same number of sub-carriers. For example, when more information is included and to be signaled within the first SIG and first data than the second SIG and second data, the first subset of sub-carriers may include relatively more sub-carriers than the second subset of sub-carriers. Note also that the lengths of the first and second SIGs as well as the length of the first and second data portions of the OFDMA packet may be the same or different. For example, in some instances, both the first and second SIGs are of a first length, and the first and second data portions are of a second length.

The OFDMA packet may be generated based on a selected OFDMA packet structure that is selected from among a number of possible OFDMA packet structures. Various criteria may be used to select which OFDMA packet structure is appropriate in a given instance. For example, upon identification of which data is to be transmitted to each of the first and second other devices, an OFDMA packet structure may be selected from among a number of possible OFDMA packet structures. In addition, other considerations such as the amount of information to be included within at least one SIG for signaling information for at least one recipient device (e.g., one or both of the first and second other wireless communication devices), the amount and type of at least one training field for use in transmissions to the at least one recipient device (e.g., at least one short training field (STF), and/or at least one long training field (LTF), and/or other training field or training information such as that which may be transmitted on one or more pilot tones are sub-carriers, etc.), and/or other considerations.

Figure 2:
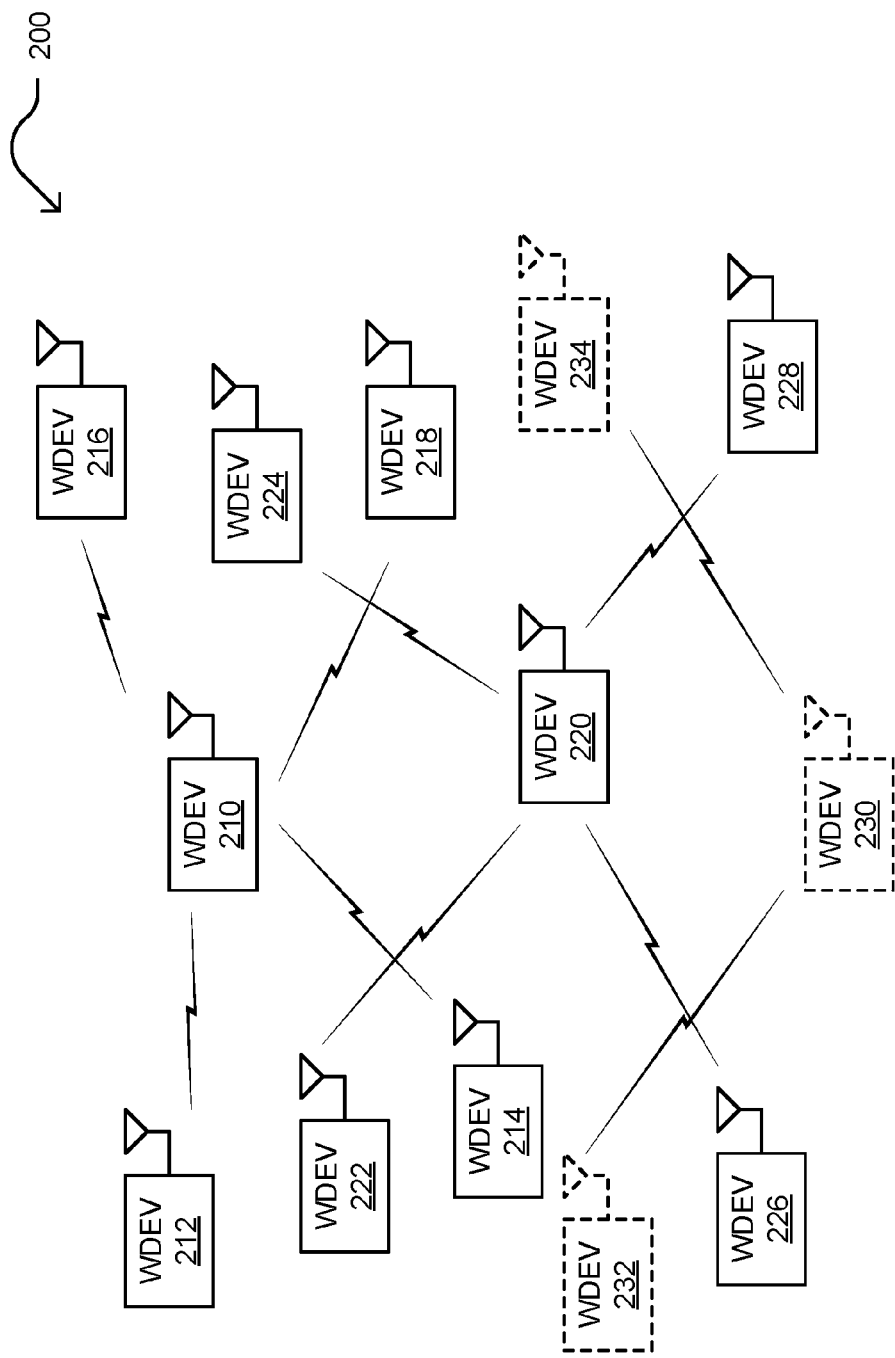
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

Any one of the various WDEVs 210-234 may be implemented to include a processor and a communication interface to generate, process, interpret, and transmit OFDMA packets for transmission to and/or reception from other of the WDEVs 210-234. For example, a device may include a processor configured to generate an OFDMA packet. In one example, the OFDMA packet may include certain characteristics including having a common signal field (SIG) for first and second other wireless communication devices modulated across all sub-carriers of the OFDMA packet. Within the OFDMA packet, the common SIG is followed by first SIG and first data for the first other wireless communication device modulated across first subset of the sub-carriers of the OFDMA packet. Also, in this example, the common SIG is followed by second SIG and second data for the second other wireless communication device modulated across second subset of the sub-carriers of the OFDMA packet. The first SIG may be implemented to have a different length than the second SIG or the same length as the second SIG. The processor of the device is also configured to transmit the OFDMA packet, via a communication interface of the device, to the first and the second other wireless communication devices. Note that the processor may be configured to generate different OFDMA packets based on different OFDMA packet structures at different times and based on different considerations.

Figure 3A:
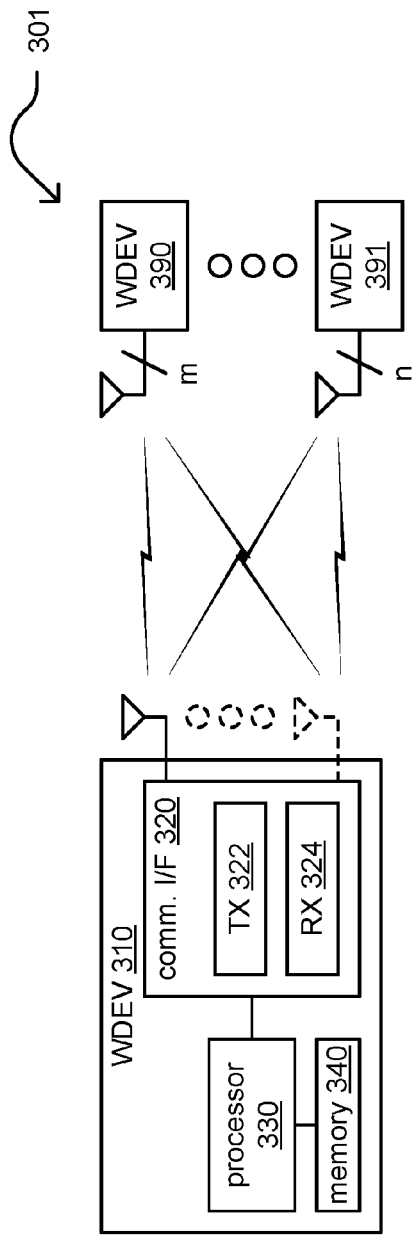
FIG. 3A is a diagram illustrating an example of communication between wireless communication devices.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). The wireless communication device 310 also includes a processor 330, and an associated memory 340, to execute various operations including interpreting at least one packet or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one packet or frame (e.g., WDEV 390 may include m antennae, and WDEV 391 may include n antennae).

In an example of operation, processor 330 is configured to generate an OFDMA packet. The OFDMA packet includes common signal field (SIG) for first and second other wireless communication devices 390 and 391 modulated across all sub-carriers of the OFDMA packet. The common SIG is followed by first SIG and first data for the first other wireless communication device 390 modulated across first subset of the sub-carriers of the OFDMA packet, and the common SIG is also followed by second SIG and second data for the second other wireless communication device 391 modulated across second subset of the sub-carriers of the OFDMA packet. The first SIG may be implemented to have a different length than the second SIG or the same length as the second SIG. Processor 330 is also configured to transmit the OFDMA packet, via the communication interface 320, to the first and the second other wireless communication devices 390 and 391.

In certain instances, the length of the common SIG is based on at least one of number of the first and the second other wireless communication devices 390 through 391 (e.g., which may include two or more other wireless communication devices) and amount of both the first and the second data (and/or third, fourth, etc. data intended for any other wireless communication devices included in the other wireless communication devices 390 through 391). The length of the first SIG is based on the amount of the first data, and length of the second SIG is based on the amount of the second data.

In another example of operation, the processor 330 is configured to generate an OFDMA packet such that a common SIG of the OFDMA packet is adjacently followed by first short training field (STF) for the first other wireless communication device 390 that is adjacently followed by the first SIG that is followed by the first data modulated across the first subset of the sub-carriers of the OFDMA packet, and the common SIG is also adjacently followed by second STF for the second other wireless communication device 391 that is adjacently followed by the second SIG that is followed by the second data modulated across the second subset of the sub-carriers of the OFDMA packet.

In another example of operation, the processor 330 is configured to identify the first data for the first other wireless communication device 390 and the second data for the second other wireless communication device 391. Then, based on the identification of the first and second data, the processor 330 is configured to select OFDMA structure for the OFDMA packet based on amount of both the first and the second data. The OFDMA structure specifies at least one of length of the common SIG, length of the first SIG, length of the second SIG, the first subset of the sub-carriers, and the second subset of the sub-carriers.

In another example of operation, the processor 330 is configured to generate another OFDMA packet that has a different OFDMA packet structure then the previously generated OFDMA packet. For example, different data for each of the first and second other wireless communication devices may be modulated across different subsets of sub-carriers. In addition, the length of the data in this other OFDMA packet may be different than the length of the first and second data within the originally generated OFDMA packet.

Figure 3B:
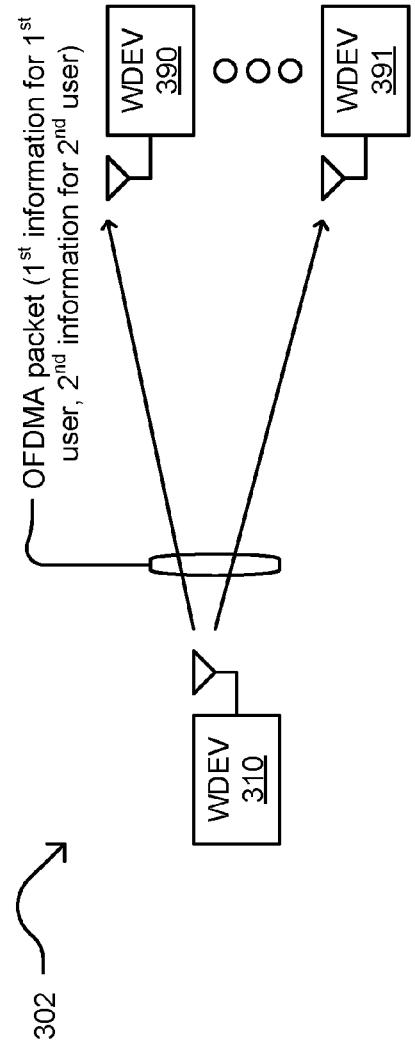
FIG. 3B is a diagram illustrating another example of communication between wireless communication devices.

FIG. 3B is a diagram illustrating another example 302 of communication between wireless communication devices. Processor 330 of device 310 is configured to transmit, via communication interface 320, an OFDMA packet that includes first information for a first user/recipient device 390 and second information for a second user/recipient device 391. Note that different OFDMA packets based on different OFDMA structures may be transmitted from device 310 different times. Note also that different OFDMA packets may include information for different groups of recipient devices. For example, a first OFDMA packet may include information for only device 390 or 391. A second OFDMA packet may include information for both devices 390 and 391. A third OFDMA packet may include information for one of the device 390 or 391 and at least one other device.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

A wireless communication device may be implemented to include a processor that is configured to generate an OFDMA packet based on a selected OFDMA packet structure that complies with the general format of an OFDMA packet or packet/frame as described herein.

FIG. 5A is a diagram illustrating an example 501 of an OFDMA packet. This packet includes at least one preamble symbol followed by at least one data symbol. The at least one preamble symbol includes information for use in identifying, classifying, and/or categorizing the packet for appropriate processing.

FIG. 5B is a diagram illustrating another example 502 of an OFDMA packet. This packet also includes a preamble and data. The preamble is composed of at least one short training field (STF), at least one long training field (LTF), and at least one signal field (SIG). The data is composed of at least one data field. In both this example 502 and the prior example 501, the at least one data symbol and/or the at least one data field may generally be referred to as the payload of the packet.

Various examples are described below for possible designs of a preamble for use in wireless communications as described herein. Note that any of the various preamble designs described herein may be post-pended with at least one data field. Note also that different preamble portions may be tailored for and transmitted via different sets of sub-carriers (e.g., and/or different channels such that each channel is composed of at least one sub-carrier, such as a first channel is composed of a first sub-carrier, a second channel is composed of a second sub-carrier, etc.).

FIG. 5C is a diagram illustrating another example 503 of an OFDMA packet. Such an OFDMA packet may be implemented as a mixed format PLCP Protocol Data Unit (PPDU). This diagram shows an example packet where information for various users is multiplexed in the time (shared PPDU), frequency (using orthogonal frequency division multiple access (OFDMA) techniques), and/or spatial (using MU-MIMO techniques) domains.

Various portions of the packet are partitioned among various frequency sub-bands (e.g., each frequency sub-band may be viewed as a channel that is composed on at least one sub-carrier based on OFDMA signaling techniques), and each frequency sub-band or channel is used to transmit a portion of the OFDMA packet. In some instances, information for more than one user is transmitted via a channel and information for only one user is transmitted via the channel in other instances. Some of those PPDU share 2 (or more) users in the spatial domain using multi-user multiple-input-multiple-output (MU-MIMO) signaling techniques. Users #1,2 (e.g., shown as WDEV_1,2 in the diagram and corresponding to 2 different devices) share the same time (i.e., same OFDMA symbols) and frequency sub-band or channel for a first period of time and so do users #4,5 and users #7,8. Separating these users in frequency and/or time is achieved via OFDMA and/or MU-MIMO signaling techniques. Note that different portions of the packet correspond to different respective users at different times. Note also that the frequency sub-bands or channels are not of identical width. For example, the frequency sub-band or channel extending from x1 to x2 (e.g., for WDEV_9 or user #9 in a first period of time and for WDEV_10 or user #10 in a second period of time) is of different width that the frequency sub-band or channel extending from x2 to x4 (e.g., for WDEV_6 or user #6). A device may be configured to transmit different portions of the OFDMA packet using different channels at different times. For example, at the right hand side of the packet, two portions of the OFDMA packet (i.e., for users #4,5 and users #7,8) may be viewed as being transmitted using 2 different frequency sub-bands or channels (each composed of respective a set of sub-carriers), while at the left hand side of the packet, three portions of the OFDMA packet (i.e., for users #1,2, user #1, and user #9) may be viewed as being transmitted using 3 different frequency sub-bands or channels (each composed of respective a set of sub-carriers).

Several constraints are presented herein that may be applied to a generic packet (Downlink (DL) and Uplink (UL)) that supports orthogonal frequency division multiple access (OFDMA), multi-user multiple-input-multiple-output (MU-MIMO) and/or time aggregation in order to reduce complexity while maintaining certain features. In the UL, the Legacy fields (shown in the various examples throughout the disclosure, often preceded by "L-") may not be present since UL shared packets that use OFDMA and/or UL MU-MIMO and/or time aggregation will be preceded by a DL sync packet that provides the legacy protection. UL packets may also not contain the SIG field or contain a partial SIG field since most of the information will reside in the sync packet.

A general packet format is shown in this diagram where multiple user (MU) signaling is performed over some sub-channels and not in others, duration and width of user allocation varies and is completely flexible. The Y-axis/vertical axis is sub-carriers/frequency/and/or bandwidth, and the X-axis/horizontal axis is time showing the length or duration of a packet. MU-MIMO is shown by way of multiple users sharing the same rectangle.

FIG. 5D is a diagram illustrating another example 504 of an OFDMA packet. The OFDMA packet includes common signal field (SIG) for first and second other wireless communication devices modulated across all sub-carriers of the OFDMA packet. The common SIG is followed by first SIG and first data for the first other wireless communication device modulated across first subset of the sub-carriers of the OFDMA packet, and the common SIG is also followed by second SIG and second data for the second other wireless communication device modulated across second subset of the sub-carriers of the OFDMA packet. In this diagram, the first and second SIGs that have the same length or duration are transmitted via two different channels having a same number (though different sets) of sub-carriers. Also, the first and second data have the same length or duration.

FIG. 5E is a diagram illustrating another example 505 of an OFDMA packet. In this diagram, the first SIG has different length than the second SIG. Also, the first data has different length than the second data. Moreover, the first SIG and first data are transmitted via a first channel having a first number of sub-carriers, and the second SIG and second data are transmitted via a second channel having a second number of sub-carriers.

Various additional examples are presented that allow for multiple user (MU) transmissions on a portion of the basic services set (BSS) bandwidth (BW) using OFDMA and/or MU-MIMO signaling techniques. The current version of the IEEE 802.11ac standard design of MU allows for transmission over the entire BW or not based on MU at all (i.e., using single user (SU) communications) and this can reduce the chances of MU being successful in 80/160 MHz because all wireless stations (STAs) need to be able to receive over full BW without overlapping basic services set (OBSS) interference (null data packet (NDP) and MU packet) and an access point (AP) should be configured to detect all STAs over the full BW (e.g., for channel estimation or acknowledgements (ACKs)).

Certain constraints may be used in a communication system to support such OFDMA and/or MU-MIMO communications. Examples of such constraints are provided below. A first constraint is that all OFDMA packet structure allocations (e.g., in a given time segment, such as a packet length) have the same duration. For example, while different OFDMA structures may be used at different times, each may be constrained to have a common overall OFDMA packet length (though the durations of internal portions of the OFDMA packet may vary from packet to packet).

Considering frequency and time, frequency is relatively more important as can be used to provide for frequency selective scaling (e.g., users may be allocated to best sub-bands or sub-channels (e.g., a subset of sub-carriers of a channel)). Effective management of frequency reuse can improve OBSS interference issues. Also, appropriately selected OFDMA chunk size can partially compensate for lack of time flexibility and OFDMA chunk size can be adjusted based on information length. This can simplify time related signaling (e.g., one time value may be used for entire BW and not per sub-channel).

A second ($2^{nd}$) constraint is to limit MU chunk resolution to a predetermined minimum width (e.g., 20 MHz) or higher. Unlike OFDMA, MU is typically used for medium to high signal to noise ratio (SNR) users who receive high traffic and don't benefit so much from using less than 20 MHz sub-channels.

Another ($2^{nd}$) novel feature is the allowance of multiple MU zones in a time segment. For example, in an 80+80 MHz sub-channel BSS (total of 160 MHz, composed of two 80 MHz sub-channels), each 80 MHz sub-channel serves different MU users.

A third ($3^{rd}$) constraint is that any one user belongs to only one allocation in a time segment. However, such a user could belong to multiple allocations across segments. In some instances, this may simplify user decoding without penalizing flexibility and performance much.

A fourth ($4^{th}$) constraint is to set a limit on the number of MU/OFDMA (total or separate for OFDMA and MU) users in a time segment to limit complexity (e.g., set a maximum number of users, such as 8). The users can be multiplexed in MU or OFDMA forms or both.

Another ($3^{rd}$) novel feature and a fifth constraint is to enable micro-sleep. With micro-sleep, the initial SIG of an OFDMA packet provides information sufficient for every user to know its respective place in a given time segment and OFDMA allocation so that that devices could sleep until its allocation time occurs and so that it doesn't need to decode multiple allocations in order to find its specific allocation. It may be acceptable for a user to decode multiple per-allocation SIG2 (e.g., a SIG occurring after an original or first SIG, SIG1, as described below).

Another ($4^{th}$) novel feature is to enable a flexible or variable length signal field (SIG) (e.g., which may be composed of more than one SIG, such as multiple SIGs). Current IEEE 802.11 systems use a fixed length SIG field. However, by using OFDMA signaling and time segments, a flexible or variable length SIG field may be used. Packets that carry information for many users will require larger SIG and can support longer SIG since the alternative of one packet per user is still much longer. In comparison to prior versions of IEEE 802.11 that require fixed length SIG fields, a novel OFDMA packet structure design is presented herein that allows for SIG size growing (e.g., including allowing more than one SIG) with each new generation of IEEE 802.11 and modification to communication protocols. For example, IEEE 802.11ac required more signaling for Multiple user (MU) applications (e.g., VHT-SIGB is essential used only for an MU frame) but VHT-SIGB is included in all frames. To accommodate development of new communication protocols, new OFDMA packet structures are presented herein to allow for very wide range of required signaling (e.g., consider the contrast between the extremes of an SU packet vs. multi-user OFDMA and/or MU packet).

Examples that may include fixed-length signaling may possibly incur an unnecessarily large overhead for simple (e.g., SU) packets and may impose an unnecessarily strict limitation on maximum number of users that may be included per OFDM packet. A novel OFDM packet design that allows for variable length signaling does not require high complexity. Also, the contents of SIGs may be easily parsed as can be seen in the various examples below. Multiple options may be provided for a physical layer (PHY) of a communication device to learn how many OFDM symbols are in SIG including (1) using a 90 degree phase rotated BPSK during last symbol of SIG, and/or (2) using explicit signaling of # of OFDM symbols at beginning of SIG.

Based on the previous constraints and features, any one of the following four options below may be employed based on whether physical layer (PHY) service data unit (PSDU) aggregation is allowed. Another consideration is whether there is one HEW SIG for all segments. Note that HEW refers to High Efficiency Wireless, next generation developments, and/or the currently developing IEEE 802.11ax standards, which may be used for wireless communications.

The novel OFDMA packet structures presented herein allow for support for flexible number of OFDMA and MU allocations in DL and UL packets. Also, efficient signaling allows for different number of co-scheduled users to be accommodated. Packets that are similar to 11ac should have roughly similarly sized (# of bits) SIG. The SIG size may grow due to new and additional fields being added to certain OFDMA packet structures, but the SIG size can be constrained not to grow beyond some limit to accommodate the increased flexibility. Packets that support more users can have a relatively larger SIG (e.g., the number of bits can grow with the number of allocations).

An AP may be configured to control overhead within the wireless communication system. For example, all new DL and UL OFDMA and MU features may be managed by the AP. If preferred, the communication protocol can limit the maximum SIG overhead by various means including putting a limit on the number of allocations in a given OFDMA symbol (e.g. 8) and/or putting a limit on the number of symbols the SIG can have. The complexity of one or more STAs in the system may be minimized. For example, a STA may be constrained to only be in one allocation at a given OFDMA symbol. Certain functionality such as group identifier (GID) and/or partial association identifier (PAID) may be used with certain modifications or optimizations. Also, SIG information may be split among more than one SIG (e.g., split of information between SIG1 and SIG2). SIG1 is currently repeated over 20 MHz—OK in 11ac since each user spans the entire BW but with OFDMA this can be suboptimal→move some info into SIG2 which is per allocation.

GID may be used for DL MU in a BSS with small number of STAs. However, note that efficient use of GID may result in overloading of the groups. This may be inefficient for UL MU or for BSS with many STAs and may be too complicated for an AP to design efficient groupings. This may also lead to extremely high management overhead. The GID concept also doesn't extend well to OFDMA where the specific location within a group is important (to support SST).

For other cases, partial association identifier (PAID) may be used (e.g., for OFDMA and MU allocations in both the DL and UL). The AP may be configured to signal which option is used for DL MU. Also, if one MU allocation uses an overloaded GID, then other allocations can be made using PAID. In case of conflict between GID and PAID (e.g., a STA finds itself in one GM-addressed and one PAID-addressed allocation), then the STA is configured to follow the PAID because it is unique. PAID overhead may be improved such that the number of bits should grow with number of STA in BSS. For example, the number of bits for PAID may be initially provisioned for a first number of bits (e.g., 3 bits, such as for an indoor implemented AP) and can be grown to a higher number (e.g., 7 bits for an outdoor implemented AP). A STA may be assigned an initial number of bits for AID (e.g., 14 bit AID at association), and the AP may then signal how many least significant bits (LSBs) are used in the current SIG. This can also be used to provision a variable length SIG. A BSS with many users may co-schedule more OFDMA users and benefit from the improved efficiency. Also, in order to avoid confusing users associated with different BSS, the SIG may be designed to contain an AP ID, which could also serve as the BSS color using a certain number of bits (e.g., 7 bits).

In the following diagrams, note that "HEW" fields indicated in the various diagrams indicated new fields that may be included for any one or more of STF, LTF, SIG fields that may occur in preambles of such OFDMA packet structures (e.g., short training field (STF), long training field (LTF), and signal field (SIG)). Note also that payload or data information (e.g., WDEV_x to indicate data for user #x) may be interspersed among various preamble portions. In other words, certain examples of OFDMA packets include at least one preamble portion followed at least one data portion, which are then followed by at least one other preamble portion followed at least one other data portion. In comparison to FIG. 5A, which included at least one preamble portion (e.g., at least one preamble symbol) followed at least one data portion (e.g., at least one data symbol), an alternative OFDMA packet structure may include any combination of preamble portions (e.g., each composed of at least one preamble symbol) and data portions (e.g., each composed of at least one data symbol).

FIG. 6A is a diagram illustrating another example 601 of an OFDMA packet. This packet structure splits information such that legacy fields (L-fields) are followed by a common SIG (HEW-SIG1) both of which is modulated across all sub-carriers of the OFDMA packet. The common SIG is followed by first SIG and first data for first and second other wireless communication devices (e.g., WDEV_1, 2) modulated across first subset of the sub-carriers of the OFDMA packet. The common SIG is also followed by second SIG and second data for third other wireless communication device (e.g., WDEV_3) modulated across a second subset of the sub-carriers of the OFDMA packet. The common SIG is followed by third SIG and third data for fourth, fifth, and sixth other wireless communication devices (e.g., WDEV_4, 5, 6) modulated across a third subset of the sub-carriers of the OFDMA packet. Then, the OFDMA packets include 4 additional SIGs that are followed by 4 additional data portions for 4 different sets of users (that may include data for one or more users). This diagram shows splitting information among various portions of the OFDMA packet. An initial, general, and common signal field (SIG) can include user-ID, OFDMA/MU allocation, channel or BW assignments, length of the various segments, etc. Per-allocation SIG has per user information which is not duplicated (DUP'ed).

FIG. 6B is a diagram illustrating another example 602 of an OFDMA packet. This packet structure is similar to the left hand portion of the OFDMA packet of FIG. 6A (e.g., excludes the second group of SIGs and data after the data fields depicted by WDEV_1,2, WDEV_3, and WDEV_4,5,6). This packet structure and others presented herein are more flexible than those specified by prior designs and accommodate flexible use of the available OFDMA sub-carriers by multiplexing users in the spatial and/or frequency domains. In some applications, these assignments and specifications can be performed by an AP. For example, a user may be limited to receiving (DL) or transmitting (UL) in only one allocation as determined by the AP, and the AP controls the number of co-scheduled users and whether they are multiplexed in the frequency or spatial domains. Legacy STF/LTF/SIG fields may be used for backwards compatibility. SIG1 provides information at least about users' location. SIG1 field has variable length to accommodate different number of users, and SIG2 provides information specific to a user's allocation but may be rolled into SIG1 if more efficient that way.

FIG. 6C is a diagram illustrating another example 603 of an OFDMA packet. This packet structure has no segments. This packet structure includes legacy fields (L-fields) are followed by a common SIG (HEW-SIG1) both of which is modulated across all sub-carriers of the OFDMA packet. The common SIG is followed by first data for first, second, and third other wireless communication devices (e.g., WDEV_1,2,3) modulated across first subset of the sub-carriers of the OFDMA packet. The common SIG is also followed by second data for fourth other wireless communication device (e.g., WDEV_4) modulated across a second subset of the sub-carriers of the OFDMA packet. The common SIG is followed by third data for the first, fourth, and sixth other wireless communication devices (e.g., WDEV_1,4,6) modulated across a third subset of the sub-carriers of the OFDMA packet.

The general nomenclature described above may be used to interpret various other examples of OFDMA packets described below (e.g., fields preceded by "L-" for legacy fields, fields preceded by "HEW-" for new proposed fields, short training field (STF), long training field (LTF), and signal field (SIG), WDEV_x to indicate data for user #x, etc.). These various examples are non-exhaustive and note that any combination of various fields may be made based on the principles described herein.

FIG. 6D is a diagram illustrating another example 604 of an OFDMA packet. This packet structure includes all information in one signal field (SIG) field. This packet structure includes all information one SIG (e.g., SIGA expanded) (DUP'ed per 20 MHz or also followed up by full BW SIG).

FIG. 6E is a diagram illustrating another example 605 of an OFDMA packet. This packet structure has the same SIG information repeated. This packet structure includes the same SIG design that is repeated for every segment.

FIG. 7A is a diagram illustrating another example 701 of an OFDMA packet. This packet structure meets the following design criteria: one general (common and potentially duplicated across 20 MHz HEW SIGs at the front+extra per allocation SIG, shown as various SIG2's), physical layer (PHY) service data unit (PSDU) aggregation but same duration for all users in a segment, multiple MU zones but limit on # of total users (e.g., 8), and in a given segment a user can only have one allocation (but can have allocations in multiple segments). Note that the SIG1 field may be of flexible or variable length and may be equivalent to multiple packets. The SIG1 field may be limited to N symbols per segment. The SIG1 field contents are as follows:

```
    1.  bandwidth (BW), power save (PS), short guard interval (SGI),
fast Fourier transform (FFT)_size, # SIG symbols
    2.  For (n=1 : num_segments) { % a segment starts with STF/LTF
            Length of segment
            For (k=1 : num_ofdma_allocations} {
                Allocation SU or MU
                Allocation size % unit for SU could be 2.5/5MHz, for MU
                20 MHz
                Group ID (GID)/Partial Association ID (PAID)[k]
            }
        }
```

SIG2 content is provided per allocation information (e.g. modulation coding set (MCS), Multiple user (MU), partial association identifier (PAID) in case of MU (since group identifier (GID) conveyed in SIG1 can be overloaded potential users can decode SIG2 to know with higher accuracy if this MU allocation is for them, Nsts, which is the number of spatial time streams). Note that PAID is a field that holds information that can be used to identify traffic in overlapping basic services set (OBSS).

A sixth ($6^{th}$) constraint is as follows: if overloaded GID is used for multiple MU allocations within the same time segment, the AP must ensure that any user which is part of the MU zones is a member of only one of the GID in the packet to avoid having a user needing to decode multiple allocations. This may be performed alternatively with PAID in SIG2 such that users may decode multiple SIG2 allocations to determine which allocation has the information for them which then removes this constraint.

FIG. 7B is a diagram illustrating another example 702 of an OFDMA packet. This packet structure is a subset of structure 1 whereby SIG2 has zero content and is therefore non-existent. This proposed packet structure meets the following design criteria: One general HEW SIG at the front, PSDU aggregation but same duration for all users in a segment, multiple MU zones but limit on # of total users (e.g., 8), in a given segment, a user can only have one allocation (but can have allocations in multiple segments).

The SIG field contents (which may be flexible in length) description is as follows:

```
    1.  bandwidth (BW), power save (PS), short guard interval (SGI),
fast Fourier transform (FFT)_size, # SIG symbols
    For (n=1 : num_segments) { % a segment starts with STF/LTF
        Length of segment
            For (k=1 : num_ofdma_allocations} {
                Allocation SU or MU
                Allocation size % unit for SU could be 2.5/5MHz, for
                MU 20 MHz
                GID/PAID[k], SU, (NSTS,MCS)[k] (all the IEEE
                802.11ac info)
            }
        }
```

Signal Field (SIG) Design Options

Certain tradeoffs of various SIG design with multi-segments packets are described below. One SIG1 in the beginning of a multi-segment packet enables savings from aggregation of all users's information (CRC, tail biting, etc.). An efficient mechanism to signal a variable SIG length is provided. Any of certain options may be used: (1) Use phase rotations on SIG symbols all SIG symbols are BPSK until the last one which is 90BPSK. (2) Split the variable length SIG field into two separate encoded bit streams. The first bit stream is limited to a fixed minimum symbol length of the SIG field (e.g. 2 symbols as in IEEE 802.11ac) and signals the number of subsequent SIG symbols (from 0 to some desired maximum number, e.g., 8).

One SIG1 in the beginning can lead to better power saving since users will know their location at the beginning of the packet. Multiple SIG1 (a SIG per segment) may be simpler but reduce the gain achieved by multiple segments.

A tradeoff of common SIG and per allocation SIG may be performed. The current SIG design in IEEE 802.11n/ac is being duplicated over all 20 MHz chunks of bandwidth but that may be tolerable in some instances since the channels for users occupy the entire BW. However, when OFDMA is added the number of users is increased which increases SIG overhead. A combination of the regular DUP SIG and per allocation SIG may be preferable to optimize overhead. The DUP'ed SIG describes user locations and the per allocation SIG describes specific information for that allocation.

Note that the same packet structure applies when larger FFT sizes are used (e.g. 128FFT or 256FFT in 20 MHz as opposed to 64FFT as in current IEEE 802.11n/ac). However, in this case each symbol contains more than 2× or 4× number of bits, which can lead to wasted space if the number of bits in the SIG field doesn't fill the entire symbol (e.g., 256FFT symbol has a 117 bits capacity). This disclosure proposes, among other things, that in those cases the 64FFT unit or a smaller unit is maintained and OFDMA is used to enable the SIG field to occupy a portion of the symbol and DATA can occupy the rest of the symbol as shown in the examples described below.

This approach is mainly suited for SIG2 since it is per allocation and comes after the per allocation STF/LTF fields. This is described with respect to the two examples below where the SIG2 occupies a portion of the symbol. For example, with a 256FFT (or 64FFT or 128FFT) symbol, the symbol can be divided into e.g. 4 or 8 OFDMA sub-channels and the SIG2 can occupy any number of sub-channels just like it occupies any number of OFDM symbols. In this case, the SIG1 can signal how many sub-channels are used for SIG2 or alternatively 90 degree phase rotation can be used in a similar fashion as used in SIG1.

Note that the same idea can be applied to the common SIG1, however, in this case, no particular user is identified that can use the extra space in the symbol and SIG1 is not beamformed so the information has to be modulated the same way as SIG1 for robustness.

FIG. 7C is a diagram illustrating another example 703 of an OFDMA packet. This shows a packet with various SIG field design options.

SIG Field Content Design

Option 1—using PAID in SIG1—(no GID, allows microsleep), for user #=1, . . . (variable length SIG), 4-9 bits user PAID based on (log 2(#BSS users)), 3-6 bits for allocation start (log 2(#chunks)), use previous version for MU start or new indication for SU, 3 bits for Nsts, and 1 bit for beamforming (BF).

Option 2—using GID for OFDMA (GID concept enhanced for OFDMA allocation), 11 bits GID in lieu of 4-9 bits user PAID such that every STA knows a position 0-7, for allocation #=1, . . . , x, 3-6 bits for allocation start (log 2(#chunks)), 2-3 bits # of users, 3 bits—user position, and Nsts per user.

SIG2—STBC, coding, MCS-7-8 bits. This example does not include a separate SIG2 in this case. If it has a relatively small number of bits, it may be rolled into SIG1.

Option 3—(re-use GID for MU concept as in IEEE 802.11ac, resolve ambiguity for multiple MU allocations by using just one GID to describe all MU allocations—this GID may be larger than other examples. For example, GID may expand to support more than 4 users if more than 4 users are allowed in sum total of all the MU zones in a given segment. If 4 users in total remain, then this option could also allow only a maximum of up to 2 MU zones. An 80/160 MHz BSS can be used with MU on each 20/40 MHz for 2 (or more) different users. SIG content may be indicated using GID (e.g., all MU users in all allocations). Based on this field, a user device can determine if it potentially belongs to one of the MU zones and knows his location. This may be achieved as follows:

```
For (k=1 : num_ofdma_allocations} {
  Allocation SU or MU
  Allocation size % unit for SU could be 2.5/5 MHz, for MU 20 MHz
  If SU - PAID[k]
  If MU - # of users, Nsts per user (like IEEE 802.11ac but could be
  shorter)
    Based on this a user can figure out if he belongs to this allocation
}
```

In this option SIG2 for MU will include the PAID so users can micro-sleep.

Option 4—As in IEEE 802.11ac continue to use GID for DL MU with small number of STA. Instead of always using 9-14 bits for PAID, a smaller number may be used for OFDMA and MU allocations in both the DL and UL. For DL MU the AP signals which option is used. If one MU allocation uses overloaded GID other allocations can use PAID. In case of conflict (a STA finds itself in one GID-addressed and one PAID-addressed allocation) PAID should be used because it's unique. Number of bits used for PAID should grow with number of STA in BSS—could start from e.g. 3 bits for most home AP and grow to 7 bits for outdoor AP. STA are assigned an initial e.g. 14 bit PAID (could be simply 0, 1, 2, 3, . . . ) and the AP signals how many bits (least significant bits) are used in the current packet (use LSBs of PAID). This can be based on the same principle as variable length signaling. PAID assignment should be made so that any subset is unique. In order to avoid confusing users of different BSS, the SIG may be designed always to contain an AP ID, which could also serve as the BSS color, e.g. 7 bits.

SIG Content Description

In certain implementations, at least one SIG may be designed to contain certain features are common to all OFDMA allocations including: Symbol length—1 bit, Bandwidth (BW), sub-carrier, and/or channel assignment—3 bits, OFDMA unit in this packet—2-3 bits, although the minimum unit in the spec could be small, e.g. 1.25 MHz, this specific packet is using 20 MHz OFDMA unit, AP ID (e.g., color), Number of bits used to signal PAID—3 bits (values range from 3, . . . , 10), and # of OFDMA allocations. This may be achieved as follows:

```
  For (k=1 : num_ofdma_allocations} {
    Allocation SU or MU - 1bit
    Allocation size in OFDMA units
    If SU - STA ID[k] - X bits, where X defined above
    If MU - GID or a list of PAID + 1bit to signal which option is used
    Allocation parameters
    Coding, STBC/BF, MCS, Nss
  }
```

Figures 8A, 8B:
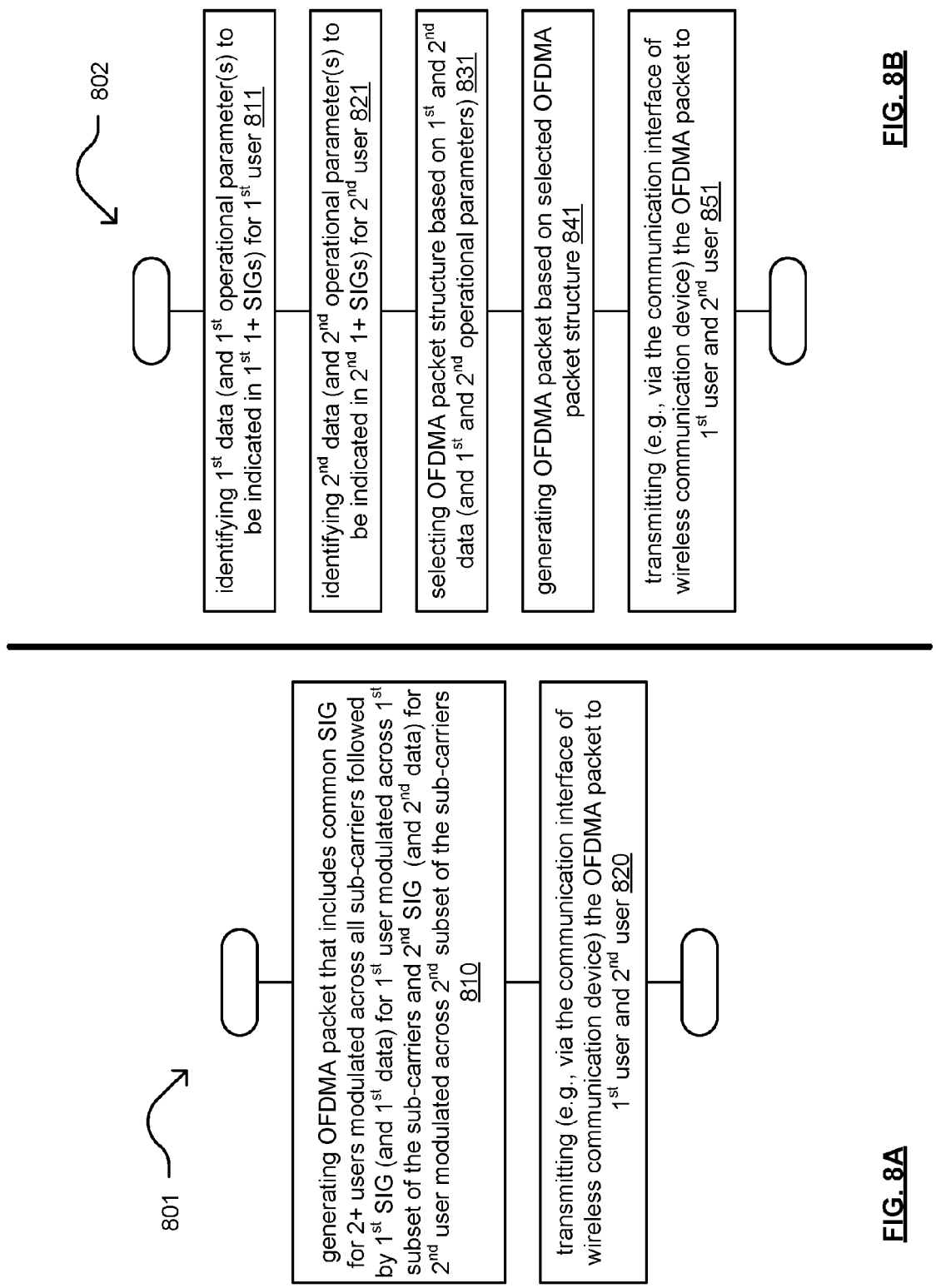
FIG. 8A is a diagram illustrating an embodiment of a method for execution by at least one wireless communication device.
FIG. 8B is a diagram illustrating another embodiment of a method for execution by at least one wireless communication device.

FIG. 8A is a diagram illustrating an embodiment of a method 801 for execution by at least one wireless communication device. The method 801 begins by generating an OFDMA packet (block 810). The OFDMA packet includes common SIG for first and second other wireless communication devices modulated across all sub-carriers of the OFDMA packet. The common SIG is followed by first SIG and first data for the first other wireless communication device modulated across first subset of the sub-carriers of the OFDMA packet. The common SIG is also followed by second SIG and second data for the second other wireless communication device modulated across second subset of the sub-carriers of the OFDMA packet, wherein the first SIG has different length than the second SIG. Note that the number of sub-carriers within each of the first and second subsets may be the same or different. In some instances, more sub-carriers are included in the first subset of the sub-carriers than in the second subset of the sub-carriers, or vice versa in other instances. The method 801 continues by transmitting the OFDMA packet, via a communication interface of the wireless communication device, to the first and the second other wireless communication devices (block 820).

FIG. 8B is a diagram illustrating another embodiment of a method 802 for execution by at least one wireless communication device. The method 802 begins by identifying first data to be indicated within first at least one SIG (block 811). The method 802 may optionally operate by also identifying first at least one operational parameter to be indicated within the first at least one SIG.

The method 802 continues by identifying second data to be indicated within second at least one SIG (block 821). The method 802 may optionally operate by also identifying second at least one operational parameter to be indicated within the second at least one SIG.

Generally, the method 802 operates by identifying different data and/or different operational parameters associated with different recipient wireless communication devices or users to be indicated within different SIGs of an OFDMA packet. The method 802 then operates by selecting an OFDMA packet structure (e.g., from among a number of possible if you may packet structures) based on the first and second data (block 831). The method 802 may optionally operate by selecting the OFDMA packet structure based on the first and second data, as well as first and second operational parameters associated with the first and second users associated with first and second recipient devices.

The method 802 continues by generating an OFDMA packet based on the selected OFDMA packet structure (block 841). The method 802 then operates by transmitting the OFDMA packet, via a communication interface of the wireless communication device, to the first and the second other wireless communication devices (block 851).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   processing circuitry that is coupled to the communication interface, wherein at least one of the communication interface or the processing circuitry configured to:
   generate an orthogonal frequency division multiple access (OFDMA) packet that includes first one or more fields based on a first communication protocol and for a plurality of other wireless communication devices modulated across all of OFDMA sub-carriers of the OFDMA packet followed by second one or more fields based on a second communication protocol and for the plurality of other wireless communication devices modulated across all of the OFDMA sub-carriers of the OFDMA packet, wherein the second one or more fields is followed by third one or more fields for a first of the plurality of other wireless communication devices modulated across a first subset of the OFDMA sub-carriers and fourth one or more fields for a second of the plurality of other wireless communication devices modulated across a second subset of the OFDMA sub-carriers; and
   transmit the OFDMA packet, via the communication interface and via at least one wireless communication channel that includes the OFDMA sub-carriers of the OFDMA packet, to the plurality of other wireless communication devices.

2. The wireless communication device of claim 1, wherein the third one or more fields includes first data for the first of the plurality of other wireless communication devices modulated across the first subset of the OFDMA sub-carriers and the fourth one or more fields includes second data for the second of the plurality of other wireless communication devices modulated across the second subset of the OFDMA sub-carriers.

3. The wireless communication device of claim 1, wherein:
   the first one or more fields based on the first communication protocol and for the plurality of other wireless communication devices includes a first short training field (STF), a first long training field (LTF), and a first signal field (SIG); and
   the second one or more fields based on the second communication protocol and for the plurality of other wireless communication devices includes a second SIG, a second STF, and a second LTF.

4. The wireless communication device of claim 3, wherein the first SIG has a different length than the second SIG.

5. The wireless communication device of claim 1, wherein:
   the first one or more fields based on the first communication protocol and for the plurality of other wireless communication devices includes a first short training field (STF), a first long training field (LTF), and a first signal field (SIG); and
   the second one or more fields based on the second communication protocol and for the plurality of other wireless communication devices includes a second SIG, a third SIG, a second STF, and a second LTF.

6. The wireless communication device of claim 1, wherein:
   the first subset of the OFDMA sub-carriers are included within a first bandwidth of approximately 20 MHz, 40 MHz, or 80 MHz within the at least one wireless communication channel; and
   the second subset of the OFDMA sub-carriers are included within a second bandwidth of approximately 20 MHz, 40 MHz, or 80 MHz within the at least one wireless communication channel.

7. The wireless communication device of claim 1 further comprising:
   an access point (AP), wherein the plurality of other wireless communication devices includes a wireless station (STA).

8. The wireless communication device of claim 1 further comprising:
   a first wireless station (STA), wherein the plurality of other wireless communication devices includes at least one of a second STA or an access point (AP).

9. A wireless communication device comprising:
   a communication interface; and
   processing circuitry that is coupled to the communication interface, wherein at least one of the communication interface or the processing circuitry configured to:
   generate an orthogonal frequency division multiple access (OFDMA) packet that includes a first plurality of fields based on a first communication protocol that includes a first short training field (STF), a first long training field (LTF), and a first signal field (SIG) and for a plurality of other wireless communication devices modulated across all of OFDMA sub-carriers of the OFDMA packet followed by a second plurality of fields based on a second communication protocol that includes a second SIG, a second STF, and a second LTF and for the plurality of other wireless communication devices modulated across all of the OFDMA sub-carriers of the OFDMA packet, wherein the second one or more fields is followed by third one or more fields for a first of the plurality of other wireless communication devices modulated across a first subset of the OFDMA sub-carriers and fourth one or more fields for a second of the plurality of other wireless communication devices modulated across a second subset of the OFDMA sub-carriers; and
   transmit the OFDMA packet, via the communication interface and via at least one wireless communication channel that includes the OFDMA sub-carriers of the OFDMA packet, to the plurality of other wireless communication devices, wherein the first subset of the OFDMA sub-carriers or the second subset of the OFDMA sub-carriers are included within a bandwidth of approximately 20 MHz, 40 MHz, or 80 MHz within the at least one wireless communication channel.

10. The wireless communication device of claim 9, wherein the third one or more fields includes first data for the first of the plurality of other wireless communication devices modulated across the first subset of the OFDMA sub-carriers and the fourth one or more fields includes second data for the second of the plurality of other wireless communication devices modulated across the second subset of the OFDMA sub-carriers.

11. The wireless communication device of claim 9, wherein the first SIG has a different length than the second SIG.

12. The wireless communication device of claim 9 further comprising:
an access point (AP), wherein the plurality of other wireless communication devices includes a wireless station (STA).

13. The wireless communication device of claim 9 further comprising:
a first wireless station (STA), wherein the plurality of other wireless communication devices includes at least one of a second STA or an access point (AP).

14. A method for execution by a wireless communication device, the method comprising:
generating an orthogonal frequency division multiple access (OFDMA) packet that includes first one or more fields based on a first communication protocol and for a plurality of other wireless communication devices modulated across all of OFDMA sub-carriers of the OFDMA packet followed by second one or more fields based on a second communication protocol and for the plurality of other wireless communication devices modulated across all of the OFDMA sub-carriers of the OFDMA packet, wherein the second one or more fields is followed by third one or more fields for a first of the plurality of other wireless communication devices modulated across a first subset of the OFDMA sub-carriers and fourth one or more fields for a second of the plurality of other wireless communication devices modulated across a second subset of the OFDMA sub-carriers; and
transmitting, via a communication interface of the wireless communication device, the OFDMA packet, via the communication interface and via at least one wireless communication channel that includes the OFDMA sub-carriers of the OFDMA packet, to the plurality of other wireless communication devices.

15. The method of claim 14, wherein the third one or more fields includes first data for the first of the plurality of other wireless communication devices modulated across the first subset of the OFDMA sub-carriers and the fourth one or more fields includes second data for the second of the plurality of other wireless communication devices modulated across the second subset of the OFDMA sub-carriers.

16. The method of claim 14, wherein:
the first one or more fields based on the first communication protocol and for the plurality of other wireless communication devices includes a first short training field (STF), a first long training field (LTF), and a first signal field (SIG);
the second one or more fields based on the second communication protocol and for the plurality of other wireless communication devices includes a second SIG, a second STF, and a second LTF; and
the first SIG has a different length than the second SIG.

17. The method of claim 14, wherein:
the first one or more fields based on the first communication protocol and for the plurality of other wireless communication devices includes a first short training field (STF), a first long training field (LTF), and a first signal field (SIG); and
the second one or more fields based on the second communication protocol and for the plurality of other wireless communication devices includes a second SIG, a third SIG, a second STF, and a second LTF.

18. The method of claim 14, wherein:
the first subset of the OFDMA sub-carriers are included within a first bandwidth of approximately 20 MHz, 40 MHz, or 80 MHz within the at least one wireless communication channel; and
the second subset of the OFDMA sub-carriers are included within a second bandwidth of approximately 20 MHz, 40 MHz, or 80 MHz within the at least one wireless communication channel.

19. The method of claim 14, wherein the wireless communication device includes an access point (AP), and the plurality of other wireless communication devices includes a wireless station (STA).

20. The method of claim 14, wherein the wireless communication device includes a first wireless station (STA), and the plurality of other wireless communication devices includes at least one of a second STA or an access point (AP).

* * * * *